Sept. 28, 1965    N. R. SPARKS    3,209,316
DETERMINING GAIN IN SEISMIC AMPLIFIERS
Filed Nov. 23, 1960    2 Sheets-Sheet 1

INVENTOR:
NEIL R. SPARKS
BY Newell Pottorf
ATTORNEY

INVENTOR:
NEIL R. SPARKS

United States Patent Office 3,209,316
Patented Sept. 28, 1965

3,209,316
DETERMINING GAIN IN SEISMIC AMPLIFIERS
Neil R. Sparks, Tulsa, Okla., assignor to Pan American Petroleum Corporation, Tulsa, Okla., a corporation of Delaware
Filed Nov. 23, 1960, Ser. No. 71,270
8 Claims. (Cl. 340—15.5)

This invention relates to seismic geophysical surveying and is directed to determining the gain or attenuation produced by automatic gain-control amplifiers used in seismic field recording, for the purpose of estimating the actual amplitude of seismic input waves, evaluating the effect of the gain control upon the recordings, and the like.

As is well known, in seismic geophysical surveying the true ground-motion amplitudes of the recorded seismic waves vary over a quite wide range during the time of each recording. Also, the range and rates of variation with time may change radically from place to place. In order to insure that the waves may be recorded with an intermediate range of amplitudes—i.e., amplitudes which are neither so large as to overload the amplifying and recording system nor so small as to make identification of the seismic arrivals difficult—gain-controlling amplifier systems have been devised which attempt to follow the ground-motion amplitude variations and compensate them so as to record them all with readable values. Since the time-versus-gain functions of these seismic amplifiers must also vary widely from place to place where surveying is conducted, the reflection amplitude data of the seismic records have been generally ignored principally because the effect of the automatic-gain-control action was not known for each recording. That is, amplitudes measured from the records had no known relationship with the actual ground-motion amplitudes.

In efforts to improve the interpretation of seismic records, it has now become apparent that a study of the true amplitudes of the ground motions producing the seismic record will be of assistance. Also, since it is known that the action of certain types of automatic gain control may strongly affect the apparent relative amplitudes of recorded seismic waves on any given record, it is desirable to known or determine as nearly as possible both the absolute gain at any time along the record and the way in which the gain varies with time during the recording.

In view of the foregoing it is a primary object of my invention to provide a novel method and apparatus for determining, from previously recorded records made using automatic gain control, an indication of the actual gain-versus-time function in effect during the original recording. A further object is to provide a novel method and apparatus by which a highly accurate recording of the amplifier gain may be made during field recording. Other and further objects, uses, and advantages of the invention will become apparent as the description proceeds.

In understanding this invention, it is important to recognize first of all that the field-record trace, in the case of a backward-feeding type of automatic gain control, which derives from the channel amplifier output a control voltage for varying the amplifier gain, represents the signal actually fed back into the gain-controlling loop of the amplifier during recording. Therefore, in accomplishing the objects of the invention, it is necessary only to play back the final field-record trace, which will be preferably in the form of a magnetic-record trace, with the proper level setting, apply the reproduced signal to the gain-control circuit elements of an amplifier like the original field recording amplifier, and record either the control voltage produced or observe its effect on a signal of constant amplitude applied to a duplicate channel amplifier. This has been found to produce a very close approximation to the original time-versus-gain function experienced by the seismic field amplifier during making of the field recording.

According to another aspect of my invention, in order to avoid such inaccuracies in the gain-function determination as may occur due to small differences in characteristics of the playback system and the field amplifier gain-control system, a field amplifier channel is typically provided with a constant-amplitude monitor voltage of a substantially different, preferably higher, frequency than the seismic frequencies to be recorded, which monitor frequency is subjected to the gain-controlling action of the field amplifier, but is prevented by appropriate filters from affecting the amplifier gain. The resulting signal, as diverted through a filter of the proper frequency to a logarithmic amplifier followed by a smoothing filter, is fed to a separate recording element and recorded as a separate trace of the field record.

This will be better understood by reference to the accompanying drawings forming a part of this application and illustrating typical embodiments of the invention, as well as the application of the invention to field recorders. In these drawings, FIGURE 1 is a circuit diagram largely in block-form of a typical field automatic gain-controlling amplifier channel;

Figure 1:
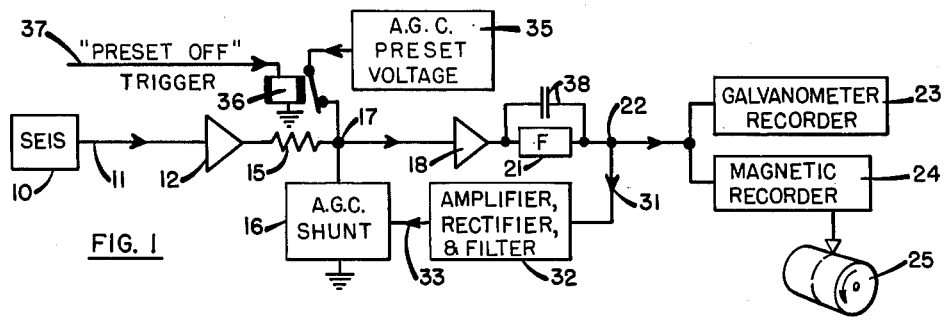

Referring now to these drawings in detail, and particularly to FIGURE 1 thereof, this figure shows the pertinent portions of a seismic channel amplifier of the type to which the present invention is applicable. Thus, a field seismometer 10 placed at a desired reception point on the ground surface is connected by a lead 11 to a recording system which is provided with a channel preamplifier 12. Preamplifier 12 may comprise one or more stages of amplification, and its output is applied to an attenuator made up of a fixed series resistance 15 and a variable shunt resistance 16. The shunt resistance 16 is preferably in the form of a balanced thermionic-diode bridge of the type described in U.S. Patent 2,663,002, although it will be understood from what follows that the principles of the invention are equally applicable to other type of backward-feeding control circuits. The varying voltage of amplifier 12, as reduced to a desired level at the point 17, is further amplified by an amplifier 18, filtered as desired by a filter 21 at the output of amplifier 18, and is then applied to a magnetic recorder 24 recording on a magnetic drum 25, and preferably also to a galvanometer monitor recorder 23 for recording as a visible trace.

The amount of gain provided by fixed-gain amplifiers 12 and 18, plus any further fixed gain in recorders 23 and 24 required to power their respective recording elements, is ordinarly made sufficient to raise the smallest significant signals from seismometer 10 to a desired or readable amplitude, with the attenuation effect of shunt 16 being negligible. Accordingly, for all signals larger than the minimum, the over-all system gain is reduced by the attenuation effect of shunt 16. Therefore, in speaking of "gain" or "attenuation" with regard to this system, it will be understood that "attenuation" means the joint effect of series resistor 15 and shunt 16, while "gain" is the total effect of the amplifiers and the attenuator, i.e., total fixed gain reduced by the variable attenuation. They, of course, vary in opposite senses; high gain means low attenuation, and vice versa.

For controlling the gain of the amplifier channel by adjustment of the value of shunt 16, the input lead 31 of an amplifying, rectifying, and filtering circuit 32 is connected to the signal channel immediately ahead of the recorders at the point 22. The output of circuit 32 at the lead 33 is a filtered direct-current voltage of a magnitude proportional to the signal voltage present at point 22 at a prior time approximating the filter time constant, and this direct-current voltage is applied to the shunt 16 to control its value. The larger the signal at point 22, the lower will be the effective resistance of shunt 16.

Such a channel when no signal is being received from the seismometer 10, will have a maximum gain. This is undesirable, however because the seismic signals received early in the recording period will normally require a medium or small gain. Therefore a gain-presetting voltage is applied to the point 17 from a source 35 through a relay 36. Typically, this presetting voltage 35 is a high-frequency, alternating-current voltage of, for example, about 2000 cycles per second which is bypassed around filter 21 by a small condenser 38. The magnitude of the preset voltage is such that at point 22 it produces the desired voltage to actuate the unit 32 and through it control the shunt 16 to an intermediate or high attenuation value as needed. By a lead 37, the actuating coil of relay 36 is connected to a suitable voltage source (not shown) which actuates the relay to disconnect the preset voltage source 35 from point 17 at some desired time after signals have begun to arrive from the seismometer 10. Because of the high frequency of the preset source 35, the galvanometer recorder 23 and magnetic recorder 24 are insensitive to this voltage and, accordingly, no record of it is produced either on the monitor recorder 23 or on the drum 25.

Upon inspection, it will be apparent that the signal voltage present at the channel point 22 and actuating therefrom the unit 32, is the same voltage recorded by the magnetic recorder 24 on the drum 25. That is to say, after point 22 there is no further variation of gain with record time, although it will be understood that the recorder 24 may include such fixed gain as is required properly to record on the drum 25. Thus, except for a possible constant amplification factor, the voltage recorded on the trace of drum 25 is identical with that passing over the lead 31 into the unit 32.

Figure 2:
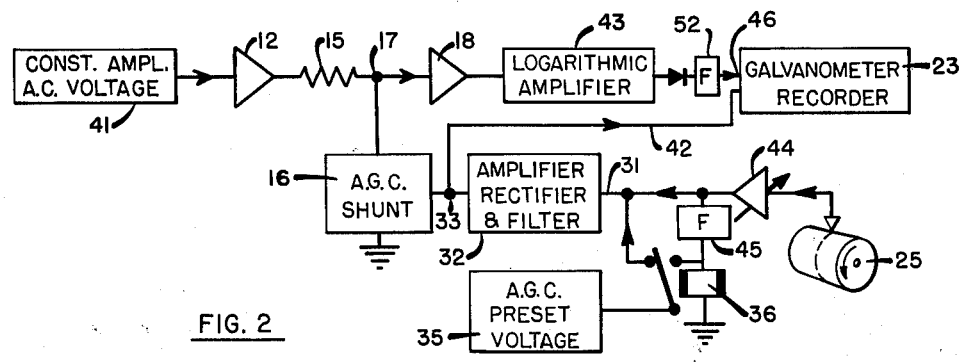
FIGURE 2 is a circuit diagram largely in block form of an embodiment of the invention for determining the gain function of previously made recordings.

This suggests the system for determining from the trace on drum 25 the actual gain of the channel amplifier during the recording period, diagrammatically shown in FIGURE 2, which includes two alternative embodiments of the invention. Thus, the recorded trace on the drum 25 is scanned by a pick-up magnetic head and applied to a reproducing amplifier 44 of constant but adjustable gain. By proper adjustment of this gain, the voltage present on the lead 31 of the unit 32 is brought to the same average level as the signal present at point 22 of the field recording system. As the system of FIGURE 2 includes several elements which are like those of the field recording system of FIGURE 1, designation by the same reference numerals is to be understood as indicating that the characteristics of the corresponding elements are as nearly identical as possible.

In place of the seismometer 10 connected to the preamplifier 12, however, there is, in the gain-determining system of FIGURE 2, a constant-amplitude alternating-current voltage source 41 while the output of the amplifier 18 is applied to a logarithmic amplifier 43 connected by a lead 46 including a smoothing filter 52 to one channel of the recording galvanometer 23. Amplifier 43, which may be one of a number of logarithm-taking amplifiers known in the art, preferably includes a rectifier so as to produce at its output a pulsating direct-current voltage proportional to the logarithm of the amplitude of the input alternating voltage. Also connected to another channel of the recorder 23 by a lead 42 is the connecting lead 33 between the control current-generating circuit 32 and the automatic gain-control shunt circuit 16.

As in FIGURE 1, a gain-control presetting voltage from a source 35 is present but is applied through the contacts of the relay 36 directly to the input lead 31 of unit 32 rather than at the point 17. It is necessary to make the magnitude of the preset voltage on lead 31 equal for both FIGURES 1 and 2, but as the gain of amplifier 18 is not available in FIGURE 2, compensation is made by adjusting the output of source 35 to a higher level. Accordingly, the value of the voltage from source 35 applied in this way to the lead 31 will be greater than that applied at the point 17 of FIGURE 1 by a factor equal to the gain of the amplifier 18 for the preset voltage frequency. By a filter 45, which rejects the voltage of source 35 due to its substantially higher frequency, the voltage from source 35 is prevented from actuating the coil of relay 36. However, the filter 45 is set to pass signal frequencies at the output of the amplifier 44, so that as soon as signals are present at the amplifier 44 output, relay 36 is actuated to disconnect the preset source 35. Thereafter, source 35 maintains the relay 36 in an actuated position.

In operation, during the playback of the trace from the drum 25, if the gain of amplifier 44 is at the proper level, the unit 32 produces on its output lead 33 substantially exactly the same voltage variations as were present at the same point in the field recording system of FIGURE 1. However, as is generally known and as is shown clearly by U.S. Patent 2,935,697, it is a property of thermionic diodes when used in circuits like shunt 16 in the manner shown by FIGURE 5 described in detail below that the attenuation expressed in decibels produced by the shunt varies linearly with the shunt control voltage. Accordingly, this voltage, as transmitted over the lead 42 to the galvanometer recorder 23, is a measure of the attenuation in units proportional to decibels, as long as the attenuation of the shunt 16 is on a logarithmic scale, a linear function of the voltage at point 33.

As a check and an alternative method of determining this time-versus-gain function even more exactly, the constant-amplitude, high-frequency signal from source 41 is subjected to the gain variations produced by shunt 16 at the point 17, amplified by amplifier 18, and the output thereof is applied to the logarithmic amplifier 43, which at its output produces a direct-current voltage proportional to the logarithm of its input voltage. After smoothing by the filter 52, the trace recorded by the galvanometer recorder 23 from the input on lead 46 is accurately proportional to the attenuation of shunt 16 in decibels.

Figure 4:
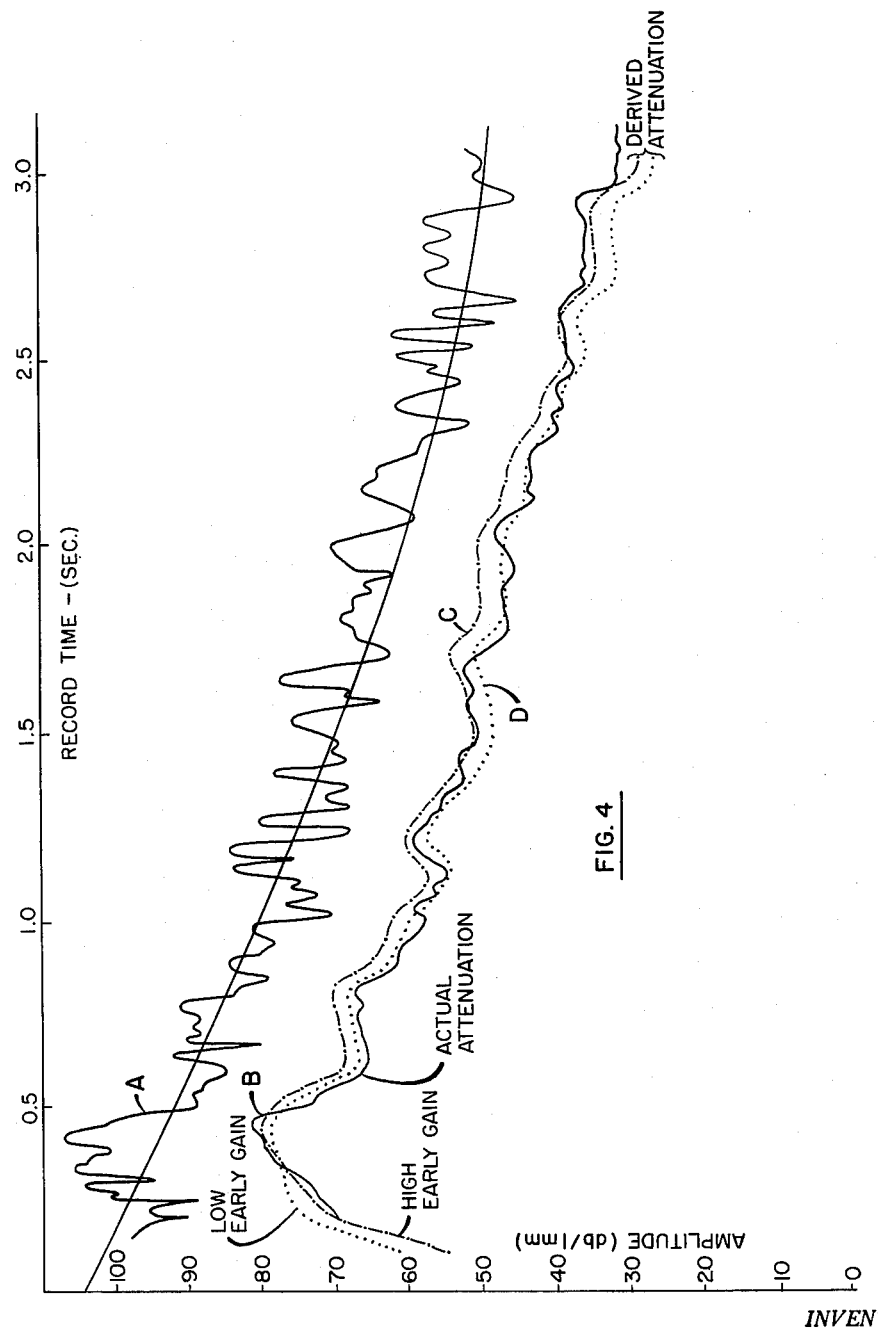
FIGURE 4 is a graph obtained from an actual field recording showing the true amplitude variations of the signals, together with the actual attenuation of the automatic gain-control amplifier, and traces showing this gain-control function as determined in accordance with the present invention.

The accuracy with which this may be done will be evident from consideration of FIGURE 4. In this figure, the upper solid-line curve A is the amplitude, in decibels above one millimeter, of trace deflections. This was measured from a field-record trace which was recorded simultaneously in two different ways. One record was made with automatic gain-control, while the other was made with different known fixed gains on a number of parallel galvanometer traces. From the latter recording, measurements were made at all record times of the heights of wave peaks and troughs, and these measurements were converted to true input amplitudes by taking account of the particular gain of the trace measured. These are the trace amplitudes which are plotted as trace A of FIGURE 4. The smooth curve passing through curve A is an over-all average variation of input amplitude throughout the entire recording period. It is thus an optimum gain-versus-time function for a smoothly varying type of gain control, such as an expander, to follow in recording the data from this particular shot.

Corresponding measurements of the amplitudes of the same waves recorded on the automatic gain-control trace were made and compared with the true wave amplitudes shown on curve A, so that it could be determined at each point of record time exactly what the attenuation by the automatic gain-control shunt was. This attenuation, in decibels, is shown as the solid-line curve B of this figure. Curve B is thus an obsolute determination of the functioning of the automatic gain-control for this record.

Curves C and D were made in a manner analogous to the operation of the system of FIGURE 2. Alternating voltages equal to the playback voltages provided by the amplifier 44 from the recording drum 25 were applied to the input lead 31 of the unit 32, and the resulting output voltages generated at the lead 33 were recorded and plotted as a function of record time. With this variation in signal voltage, the attenuation curve C or D is obtained, depending upon the level of voltage applied by the preset source 35. For a larger applied presetting voltage, resulting in a low initial gain for the amplifier channel of FIGURE 2, the dotted line D is obtained while, if the presetting voltage is lowered so that the initial channel gain is increased, the dot-dash line of curve C is obtained.

As will be obvious from inspection of FIGURE 4, both curves C and D follow very closely the actual gain-function curve B, both as to absolute magnitude and as to shape where changes in the rate of variation of gain occur. The effect of varying the level of amplifier 44 is to raise or lower curves C and D slightly with respect to curve B as a whole. No significant variation in the shape of these curves is produced by this change in gain. Accordingly, it is believed apparent that the system shown in FIGURE 2, considered with FIGURE 4, is one by which the actual gain function of an automatic gain-control channel can be re-evaluated or redetermined at a subsequent time with an error of only a few decibels. Equally important, not only is the absolute gain approximated at various times of the record, but the pattern of variation of this gain is clearly shown, so that an interpreter may be placed on guard as to the record times when amplitude distortion due to the action of the field automatic gain control may be present.

Figure 3:
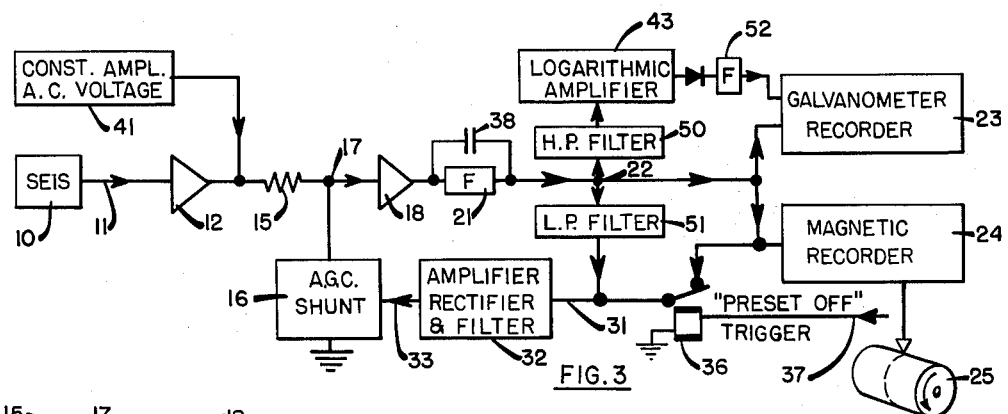
FIGURE 3 is a block circuit diagram of a gain-monitoring, automatic gain-control channel for recording gain variations with accuracy.

In FIGURE 3, is shown a system for field recording by which a monitor signal is transmitted through the gain-varying portion of the channel amplifier so that an independent record is made of the channel gain. Thus, the constant-amplitude alternating voltage source 41, similar to that of FIGURE 2, is connected ahead of the series attenuator resistor 15 in the main signal channel. This has preferably a frequency high compared to the seismic frequencies of interest such as about 2000 cycles per second, for example. Nevertheless, it is transimtted through the amplifier 18 and the bypass condenser 38 to the point 22 where it is passed through a high-pass filter 50 to the logarithmic amplifier 43 and smoothing filter 52 for recording as a visible trace by the galvanometer recorder 23. A filter 51 passing essentially only seismic frequencies through the lead 31 prevents the voltage from source 41 from affecting the gain-control feed-back loop. The gain-presetting function of source 35 in FIGURE 1 may be performed here by the voltage source 41, by inserting relay 36 in a by-pass lead bypassing filter 51. Thus, filter 51 does not reject the monitor frequency of source 41 until a trigger signal on lead 37 opens the contacts of relay 36, thus breaking the by-pass path.

The advantage of the high-frequency constant-voltage source 41 is that it provides for very accurately and quickly following the changes of gain produced by the shunt 16. Whereas several cycles of seismic frequency will occupy an appreciable length of record time, the same number of cycles at the high frequency of the source 41 will occupy only a short space of record time. Accordingly, the pulsating direct-current output of the logarithmic amplifier 43 may be smoothed with the filter 52 which is efficient at this high frequency, yet has a small time constant compared to seismic frequencies. Thus, the trace of recorder 23 will accurately indicate with negligible delay the exact value of the channel gain or attenuation. This is in contrast with well-known field signal-level recorders which, operating at seismic frequencies, require filtering with appreciable time delays in order to produce a satisfactorily smooth trace. Rapid changes in gain are not indicated until some time after they actually occur, and then with some loss of accuracy due to the filter action.

Figure 5:
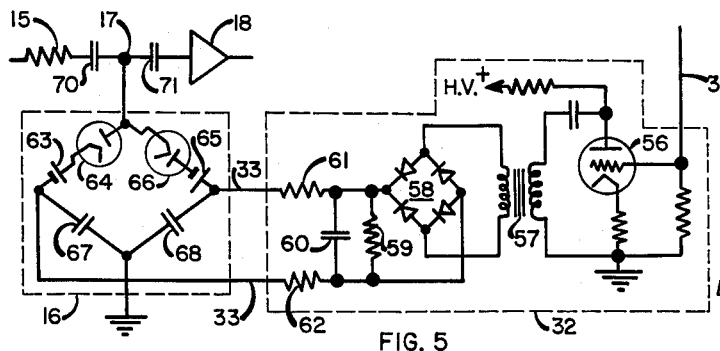
FIGURE 5 is a detailed circuit diagram of typical gain-controlling feedback loop elements.

In FIGURE 5 are shown a number of the circuit details of a typical embodiment of the unit 32 and the shunt 16. Thus, the unit 32 comprises a conventional vacuum tube amplifier, with the grid of tube 56 being connected to the lead 31, and the plate circuit including an output transformer 57. The output of transformer 57 is applied to a full-wave rectifier bridge 58 for conversion to a proportional direct current which flows through a load resistor 59. The pulsating voltage produced across resistor 59 is ripple-filtered by a shunt condenser 60 and series resistors 61 and 62. It is this smoothed direct-current voltage which is applied by leads 33 to control the resistance value of shunt circuit 16.

The latter circuit is preferably in the form of a bridge, having in one branch a bias voltage 63 and thermionic diode 64 in series in one arm, and a bias voltage 65 and thermionic diode 66 in series in the other arm. The other branch has in one arm a condenser 67 and in the other arm a condenser 68. The control voltage on leads 33 is applied to the two arm-junction points between the diode and the condenser arms, while the effective resistance of the bridge as a shunt for resistor 15 appears across the other diagonal, from the junction between the diode arms to the junction between the condenser arms.

The operation of this circuit is explained in the above-mentioned Patent 2,663,002, and in accordance with that patent the junction point 17 is preferably isolated by the direct-current blocking condensers 70 and 71 which readily pass all alternating signals but confine the controlling direct current to the diode arms of shunt 16.

While my invention thus has been described with reference to the foregoing specific details and embodiments thereof, it is to be understood that other and further embodiments and modifications will now be apparent to those skilled in the art. The invention therefore should not be considered as limited to these particular details set forth, but it is properly to be ascertained from the appended claims.

I claim:

1. The method of determining the absolute gain of a seismic automatic gain-control amplifier of the backward-feeding type from a reproducible field recording made by said amplifier which comprises reproducing said field recording as a corresponding electric signal at a voltage level approximating that applied to the gain-controlling feedback loop of said amplifier during field recording, applying said reproduced signal to a circuit which is substantially identical to the field circuit which derived the gain-control voltage, and recording the output of said identical circuit as a function of field-record time.

2. The method of determining the absolute gain of a seismic automatic gain-control amplifier of the backward-feeding type from a reproducible field-record trace made by said amplifier which comprises reproducing said trace as a corresponding electrical signal of approximately the same voltage level as that present at the field-amplifier feedback-loop input during field recording, applying said electrical signal to a control amplifier, rectifier, and filter which are connected in series and which are substantially identical to the corresponding feedback-loop elements of said field amplifier, recording as a function of field-record time an indication of the output also of said filter, applying said filter output to a substantial duplicate of the variable-gain stages of said field amplifier to vary the gain of said identical stages, applying to the signal input of said identical stages a constant-amplitude monitor signal, and recording, as a function of field-record time, an indication of the logarithm of the amplitude of said monitor signal at the output of said identical variable-gain stages.

3. In recording seismic signals through a channel amplifier having a plurality of fixed-gain signal-amplifying stages and at least one attenuator between two of said stages to reduce the channel gain for signals larger than the minimum to be recorded, wherein said attenuator is adjusted by feeding back a control voltage derived from a channel output point following said attenuator, the steps which comprise applying to the input of said attenuator in parallel with said seismic signals a constant-amplitude alternating monitor signal of a frequency substantially above the seismic frequencies to be recorded, attenuating said monitor signal equally with said seismic signals, rejecting said monitor signal from the feed-back path of said control voltage, transmitting substantially only said monitor signal from said output point to a logarithmic amplifier, rectifying the output of said logarithmic amplifier, filtering said rectifier output with a time constant large compared to the monitor-signal period but small compared to the period of the highest-frequency seismic waves, and recording as a function of seismic-record time the voltage resulting from said filtering step.

4. Apparatus for recording, for a seismic automatic gain-control field amplifier of the backward-feeding type, an indication of the absolute gain, as a function of time, that said amplifier had during the recording of a seismic field trace in reproducible form, which apparatus comprises means for reproducing said trace as a corresponding electric signal; means connected to said reproducing means for adjusting the level of said signal to substantially the level which occurred at the input to the field-amplifier gain-controlling feedback loop during the recording of said trace; a control amplifier, a control rectifier, and a control filter connected in series, said control amplifier, rectifier, and filter being substantially identical to the corresponding elements in the feedback loop of the field amplifier; an electrical lead directly connecting the output of said level-adjusting means to the input of said control amplifier; and a recorder connected to the output of said control filter adapted to record an indication of the output of said filter as a function of field-record time.

5. Apparatus as in claim 4 including, also connected to said filter output, a gain-varying element which is substantially identical to the gain-varying element of said field amplifier; a variable-gain amplifier stage coupled to said gain-varying element and substantially identical to the corresponding stage of said field amplifier; a constant-amplitude monitor-signal source connected to said identical stage input; and means connected to said stage output and adapted to record an indication of the logarithm of the amplitude of said monitor signal as a function of field-record time.

6. Apparatus as in claim 5 wherein said means to record includes a logarithmic amplifier, a rectifier connected to the output of said logarithmic amplifier, a smoothing filter connected to the output of said rectifier having a time constant long compared with the monitor-signal period but short compared to seismic-wave periods, and means for recording the voltage output of said smoothing filter.

7. Apparatus for recording the instantaneous gain of a seismic automatic-gain-control amplifier of the backward-feeding type, said amplifier comprising a plurality of fixed and variable-gain stages connected to form a signal channel including a feedback loop having its input connected to a signal-channel point following said variable-gain stages and acting on said variable-gain stages to vary their gain, said apparatus comprising a monitor-signal source, of a frequency substantially above the highest seismic frequencies to be recorded, connected to said signal channel ahead of said variable-gain stages, a first filter rejecting said monitor frequency connected at said feedback-loop input, a second filter passing substantially only said monitor frequency connected to said signal-channel point, a logarithmic amplifier connected to the output of said second filter, a rectifier and a smoothing filter connected to the output of said logarithmic amplifier adapted to produce a direct-current voltage proportional to the logarithm of the instantaneous amplitude of said monitor frequency at said signal-channel point, and means connected to said smoothing filter for recording said direct-current voltage as a function of seismic-record time.

8. In apparatus for recording the instantaneous gain of a seismic automatic-gain-control channel amplifier of the type comprising a preamplifier, an attenuator, a fixed-gain amplifier, and a recording element connected in series and having a feedback loop connected between the output of said fixed-gain amplifier and said attenuator including means for deriving a direct-current voltage proportional to the signal amplitude and applying it to said attenuator to vary its attenuation, the improvement comprising a source of consant-amplitde alternating monitor voltage of substantially higher frequency than the highest-frequency seismic waves of interest connected to said attenuator in parallel with said preamplifier, a low-pass filter in said feedback loop passing all of said seismic waves but substantially completely excluding said monitor frequency, a high-pass filter connected to said fixed-gain amplifier output passing substantially only said monitor frequency, a logarithmic amplifier connected to the output of said high-pass filter and including a rectifier for producing a direct-current voltage proportional to the logarithm of the monitor-frequency amplitude at said fixed-gain amplifier output, a smoothing filter connected to said rectifier output having a time constant long compared to the monitor-signal period but short compared to seismic-wave periods, and a recording element connected to said smoothing filter for recording its output as a function of seismic-record time.

References Cited by the Examiner
UNITED STATES PATENTS

| Re. 23,919 | 1/55 | Hawkins | 346—74 |
| 2,286,106 | 6/42 | Ritzmann | 340—15 |
| 2,420,672 | 5/47 | Maillet | 346—33 |
| 2,427,421 | 9/47 | Rieber | 346—74 |
| 2,441,065 | 5/48 | Green | 346—74 |
| 2,838,742 | 6/58 | McManis | 340—15.5 |

SAMUEL FEINBERG, *Primary Examiner.*

BENNETT G. MILLER, CHESTER L. JUSTUS,
*Examiners.*